(12) United States Patent
Copner et al.

(10) Patent No.: US 6,546,162 B1
(45) Date of Patent: Apr. 8, 2003

(54) 1½×2 OPTICAL SWITCH WITH A TRANSMISSIVE SWITCHING ELEMENT

(75) Inventors: Nigel Copner, North Gower (CA); Mark Farries, Nepean (CA); Adam D. Cohen, Nepean (CA); Rajiv Iyer, Nepean (CA)

(73) Assignee: JDS Fitel Inc., Ottawa ( * ) Notice: Subject to any disclaimer, the term of this patent is extended or adjusted under 35 U.S.C. 154(b) by 256 days.

(21) Appl. No.: 09/637,599

(22) Filed: Aug. 15, 2000

Related U.S. Application Data

(62) Division of application No. 09/334,502, filed on Jun. 17, 1999, now Pat. No. 6,154,585.

(51) Int. Cl.[7] .................................................. G02B 6/26
(52) U.S. Cl. ....................................................... 385/16
(58) Field of Search .......................... 385/16, 18, 147; 359/196, 627, 128

(56) References Cited

U.S. PATENT DOCUMENTS

| | | | | |
|---|---|---|---|---|
| 4,813,771 | A | * 3/1989 | Handschy et al. | 349/116 |
| 4,932,745 | A | * 6/1990 | Blonder | 385/18 |
| 5,381,250 | A | * 1/1995 | Meadows | 349/196 |
| 5,539,577 | A | * 7/1996 | Si et al. | 359/583 |
| 5,867,617 | A | * 2/1999 | Pan et al. | 385/16 |
| 5,900,983 | A | 5/1999 | Ford et al. | 359/627 |
| 5,959,756 | A | 9/1999 | Keyworth et al. | 359/196 |
| 6,215,919 | B1 | * 4/2001 | Li et al. | 385/16 |
| 6,320,996 | B1 | * 11/2001 | Scobey et al. | 359/128 |

FOREIGN PATENT DOCUMENTS

| | | | |
|---|---|---|---|
| JP | 55042801 | 4/1980 | G02B/5/00 |
| JP | 56142076 | 9/1981 | G02B/5/14 |
| JP | 02045921 | 2/1990 | G02B/26/08 |
| JP | 02061627 | 3/1990 | G02B/26/08 |

* cited by examiner

*Primary Examiner*—Akm E. Ullah
(74) *Attorney, Agent, or Firm*—Neil Teitelbaum

(57) ABSTRACT

A 1½×2 optical switch has two GRIN lenses, each lens having two ports on its respective outward end face. The switch has a transmissive wedge-shaped switching element disposed between the GRIN lenses. When the switching element is disposed in the path between the GRIN lenses, a single connection is established between a port of the first GRIN lens and a port of the second GRIN lens, while light is prevented from coupling between the remaining ports.

6 Claims, 6 Drawing Sheets

1½×2 OPTICAL SWITCH WITH A TRANSMISSIVE SWITCHING ELEMENT

This application is a Division of application Ser. No. 09/334,502, filed on Jun. 17, 1999 now U.S. Pat. No. 6,154,585.

FIELD OF THE INVENTION

This invention relates generally to optical switches and more particularly, to an optical switch having two states, a state with two cross-connections and a state with only a single bar connection.

BACKGROUND OF THE INVENTION

Heretofore, it has been well known to provide 2×2 optical switches having two ports on each side, wherein the switch is configurable to make a connection between ports 1 and 2 and simultaneously to provide a connection between ports 3 and 4. Alternatively, such switches are configurable to provide simultaneous connections between ports 1 and 4, and ports 3 and 2. Hence these prior art switches have two states; a first state wherein two bar connections are formed and a second state wherein 2 cross connections are formed. It is desirable to provide an optical switch that is rugged, substantially insensitive to temperature changes within an operating range of temperature, and relatively inexpensive to manufacture. Such switches are required to be capable of switching a beam of light propagating in a waveguide, for example an optical fibre from a first similar waveguide, to a second. The core diameter of a single mode optical fibre is approximately 10 $\mu$m. Providing suitable coupling in both switching states, and providing a switch that is fast enough, and tolerant of physical disturbances is a daunting task most switch manufacturers face.

A well known optical switch made by JDS Fitel Inc. that has been sold in the United States since Feb. 11, 1992 under the product number SR22xx-ONC, includes a pair of GRIN lenses 10a and 10b having a reflector or mirror 14 that can be selectively disposed therebetween as shown in FIGS. 1a and 1b. The latter figure depicts the switch in a reflecting state with the mirror positioned between the lenses 10a and 10b. Each GRIN lens has two ports offset from the optical axis (OA) of the lens. In operation, in a first state, light launched into port 1 of lens 10a couples with port 2 port on the other GRIN lens 10b, the ports being on opposite sides of a common optical axis (OA) shared by the GRIN lenses. Similarly, in the first state an optical connection is made between the other two ports 3 and 4 on lenses 10a and 10b respectively. In a second state shown in FIG. 1b, with the mirror 14 positioned between the lenses, the optical connections between ports 1 and 2, and, 3 and 4 are broken, and new optical connections is made between each pair of ports on each respective lens. Hence two connections are made, a first between ports 1 and 3, and a second connection between ports 2 and 4.

Although this switch performs its intended function, other switches have been developed by JDS Fitel Inc. that are easier to manufacture being much less sensitive to angular and/or lateral deviation of the movable optical element disposed between the GRIN lenses. For example, from a manufacturing standpoint, it is preferable to use a transmissive optical element, in which zero or an even number of internal reflections in each plane, and/or any number of refractions, are imposed on the incident light between the lenses rather than a reflective element imposing one reflection, to route, shift, or direct a beam from one port to an alternate port when the element is disposed between lenses. Thus, by providing a transmissive element such as a prism, the switch is much less sensitive to angular deviation and misalignment of the element than a switch using a reflective element such as a mirror. For example, in comparing angular sensitivity based on a 0.05 dB excess insertion loss criterion, an existing single mirror-based switch has a typical angular tolerance of 0.007 degrees; an existing prism-based switch (as in FIG. 2a) has an angular tolerance of 0.03 degrees, whereas the transmissive optical wedge-based switch described in accordance with this invention has a angular tolerance of 1.4 degrees. FIGS. 2a and 2b illustrate a 4-port 2×2 optical switch having 4 GRIN lenses wherein the ports are disposed along the optical axes of the lenses. In FIG. 2a light launched into port 1 of GRIN lens 20a traverses the gap between the lenses and couples into lens 20b and exits port 2. Similarly light launched into port 3 couples to port 4 in this bar-state.

With the switch selected to be in a cross-state shown in FIG. 2b, a movable prism is positioned into the gap between the four GRIN lenses. Alternatively, the prism can be rotatable such that in a bar-state it is rotated so that its sides are parallel to the end faces of the GRIN lenses 20a, 20b, 20c, and 20d wherein no deflection occurs, and in a cross-state the prism 25 is rotated into the position shown in FIG. 2b. Manufacturing a four port 2×2 switch such as the one shown in FIG. 2b is difficult because in a cross-state not only does port 1 have to align with port 3, but simultaneously, port 2 must align with port 4. In the instance that opposing sides of the prism are not parallel, within certain acceptable tolerances, aligning one set of ports for example, ports 1 and 4 via deflection is possible and in fact without difficulty, however simultaneously aligning the other set of ports for example ports 2 and 3 may not be possible since the orientation and location of the four GRIN lenses is fixed.

Such manufacturing difficulties are obviated by this invention since alignment of the second set of ports is not required while the transmission element is disposed between the lenses.

Configurable add drop optical circuits require one or more switches or elements providing the functionality of switching in the event that a signal is to be added or dropped to another optical signal path. The configurable add drop circuit shown in FIG. 3a allows a n-channels multiplexed signal to pass from point A to point B while providing the capability to drop one or more of the n-channels and simultaneously add a new same channel. For example a composite signal having wavelengths $\lambda$a to $\lambda$n is launched into the multiplexor 30 and is passed on to point B via the multiplexor 30b. If there is a requirement to drop the launched signal having a centre wavelength $\lambda$a and $\lambda$c and add in new signals having a centre wavelength $\lambda$a and $\lambda$c the switches 31a and 31c will selected to be in a cross-switching state such that ports 1 and 2 are coupled, and ports 3 and 4 are coupled. Otherwise, if neither adding nor dropping is desired, the switch will be in a bar-state. However one problem that results, is that if the switch is the type shown in FIGS. 1a and 1b, or 2a and 2b, is that add and drop ports become coupled to one another. This can have deleterious effects and is not always a desired goal. It is often preferred to isolate the add and drop ports from one another, preventing a connection between ports 3 and 2, when ports 1 and 4 are connected. Notwithstanding, a 2×2 switch bar state and in a cross state does not offer this type of isolation in either of its states.

The switch in accordance with this invention provides an elegant solution to this problem. Furthermore, the switch in accordance with this invention obviates the difficult requirement of ensuring that two pairs of ports are simultaneously coupled in a bar-state and in a cross-state.

It is an object of this invention to provide a relatively inexpensive and easy to manufacture switch that will serve as a 1½×2 optical switch.

It is a further object of this invention to provide an add drop circuit that does not optically couple the add and drop port with one another when that node of the switch is in a pass-through mode and not adding or dropping signals.

It is yet a further object of the invention to provide a tolerant, low loss, and reliable 1½×2 switch which allows a first and second port to be connected in a first state, without allowing a third and fourth port to be connected in the same state, and which allows a first and fourth port to be connected while the third and second ports are simultaneously connected.

SUMMARY OF THE INVENTION

In accordance with the invention, there is provided, an optical switch comprising: four ports for receiving or transmitting one or more optical signals; means for switching the switch between a first connect state and a second connect state, the switch in the first connect state having a single connection between two of the four ports while being absent a connection between the other two of the four ports, the switch in a second connect state for simultaneously providing a first connection between two ports of the four ports and a second connection between two other of the four ports.

In accordance with the invention, there is provided, an optical switch comprising: four ports for receiving or transmitting one or more optical signals; a light transmissive wedge for coupling ports between a first connect state and a second connect state, the switch in the first connect state having a single connection between two of the four ports while being absent a connection between the other two of the four ports, the switch in a second connect state for simultaneously providing a first connection between two ports of the four ports and a second connection between two other of the four ports, the wedge when inserted between the ports in a predetermined position in a path traversed by a beam launched into one of the ports, will provide for a single connection between two of the four ports while preventing light from propagating between two other of the four ports is in the first state, the wedge disposed in another predetermined position causing the switch to be in the second state simultaneously providing a first connection between two ports of the four ports and a second connection between two other of the four ports.

In accordance with another embodiment of the invention an add-drop optical circuit is provided comprising: a first multiplex/demultiplexor; a second multiplex/demultiplexor; waveguides disposed between the first and second multiplex/demultiplexors; and a plurality of 1½×2 optical switches coupled to at least some of the waveguides for adding and dropping optical signals, the optical switches substantially preventing optical signals from propagating from an add port to a drop port.

BRIEF DESCRIPTION OF THE DRAWINGS

Exemplary embodiments of the invention will now be described in conjunction with the drawings in which:

FIG. 3b is a diagram of a switch node of the add drop circuit shown in FIG. 3a;

DETAILED DESCRIPTION

Preferred embodiments of this invention are based on the use of a light transmissive wedge that is defined as an optical medium, whereby the two refracting planes are mutually arranged such that there is a finite angle or angles therebetween, such angle(s) being defined in either or both of the planes comprising the optical axis. The wedge angle (s) and centre thickness are optimised, given judicious choice of material to form the wedge, to give the desired radial offset at the focal plane of the lens, together with optimal fibre coupling efficiency.

Figure 1A:
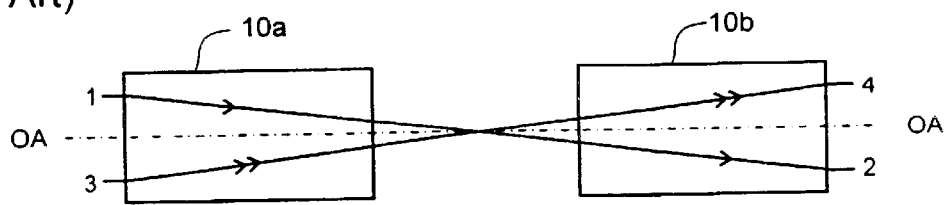
FIG. 1a is a prior art diagram of a pair of juxtaposed graded index (GRIN) lenses showing light traversing from port 1 to 2 and port 3 to 4, diagonally.
Figure 1B:
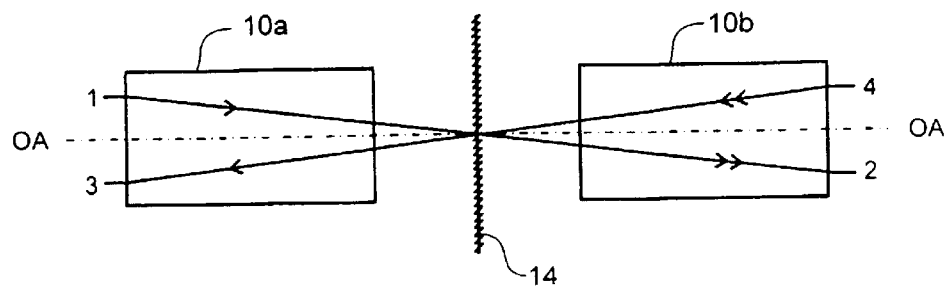
FIG. 1b is a prior art diagram of an optical switch based on the lens arrangement in FIG. 1a and having a movable mirror disposed between the lenses.
Figure 2A:
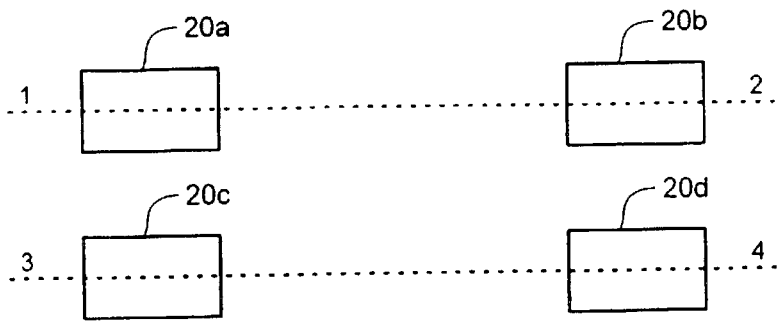
FIGS. 2a and 2b show another embodiment of a 4-port transmissive optical switch more tolerant of angular misalignment having a prism disposed therebetween.
Figure 2B:
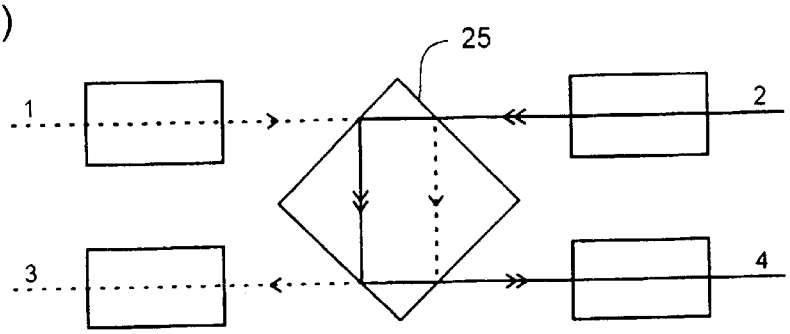
Figure 3A:
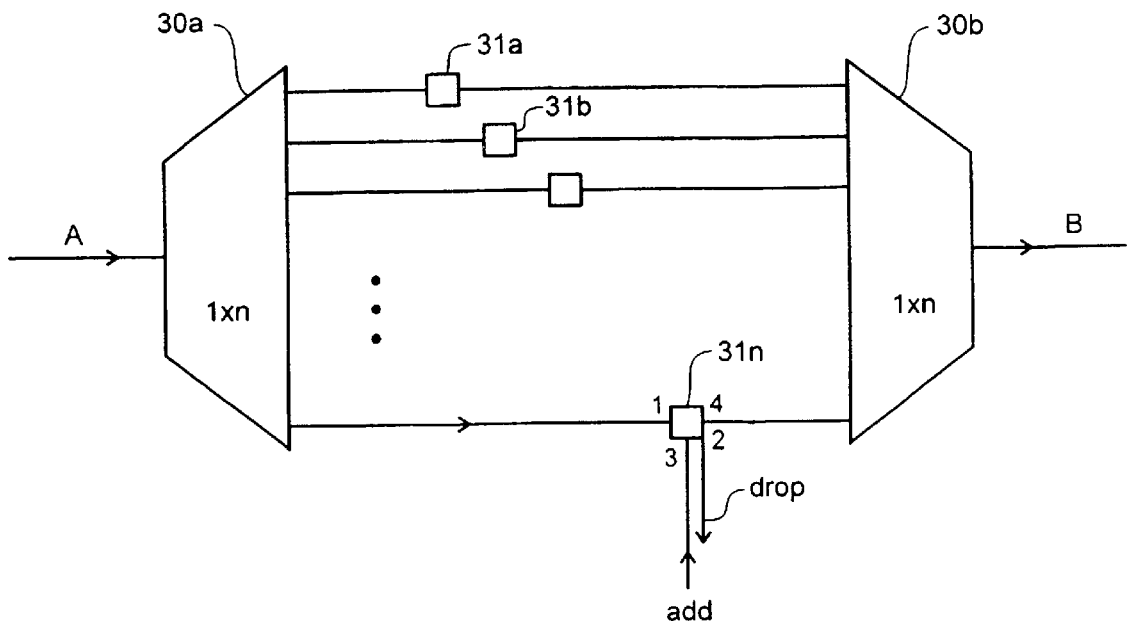
FIG. 3a is a circuit diagram of an add drop circuit in accordance with the invention.
Figure 3B:
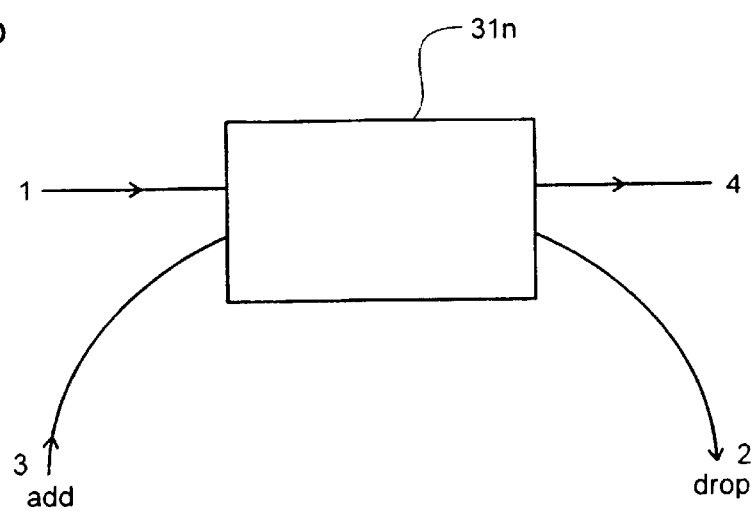
Figure 4:
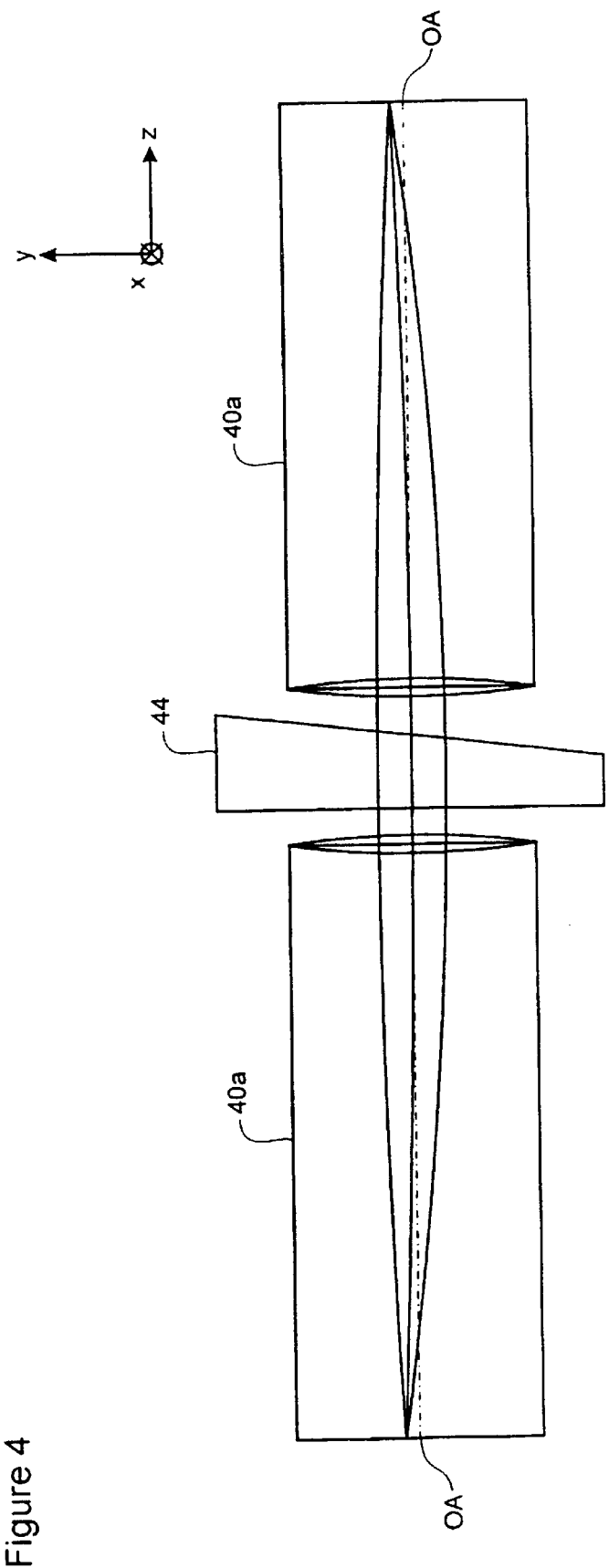
FIG. 4 is a diagram of an pair of GRIN lenses having a light transmissive asymmetric wedge disposed therebetween.
Figure 5A:
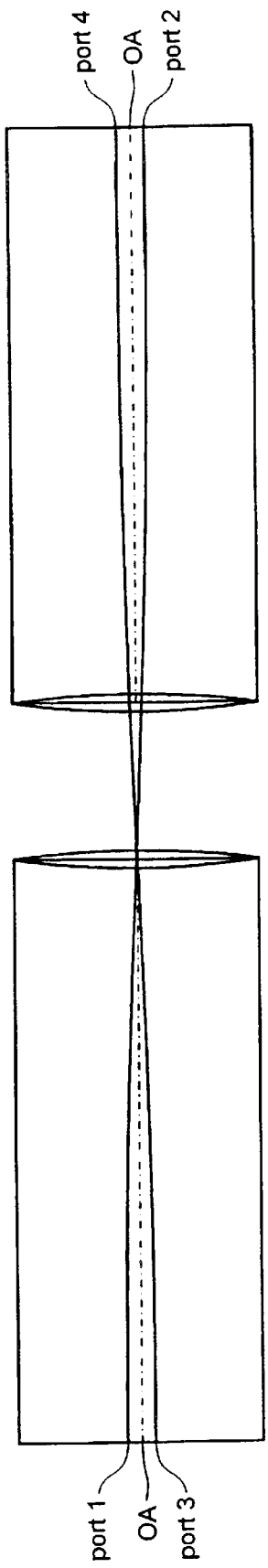
FIGS. 5a and 5b show a 1½×2 optical switch in accordance with this invention.
Figure 5B:
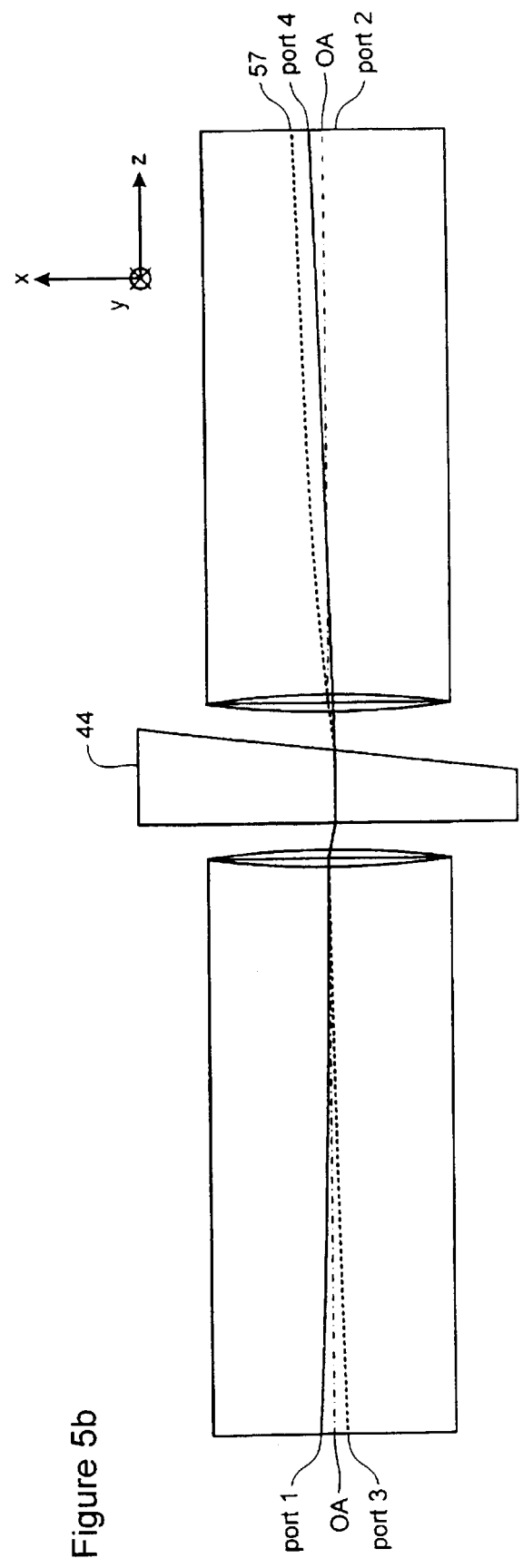
Figure 6:
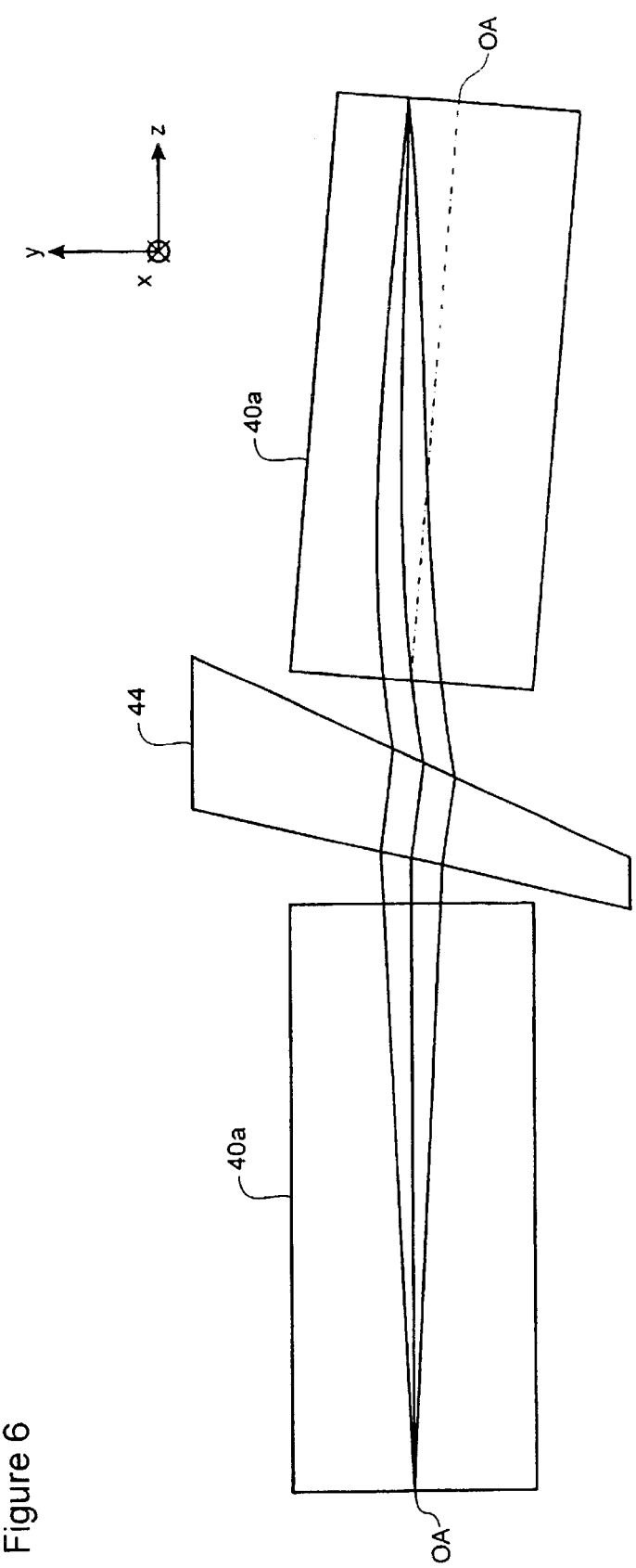
FIG. 6 is a diagram of a pair of GRIN lenses, which do not share a common optical axis, and wherein the GRIN lenses having a light transmissive asymmetric wedge disposed therebetween.
Figure 7A:
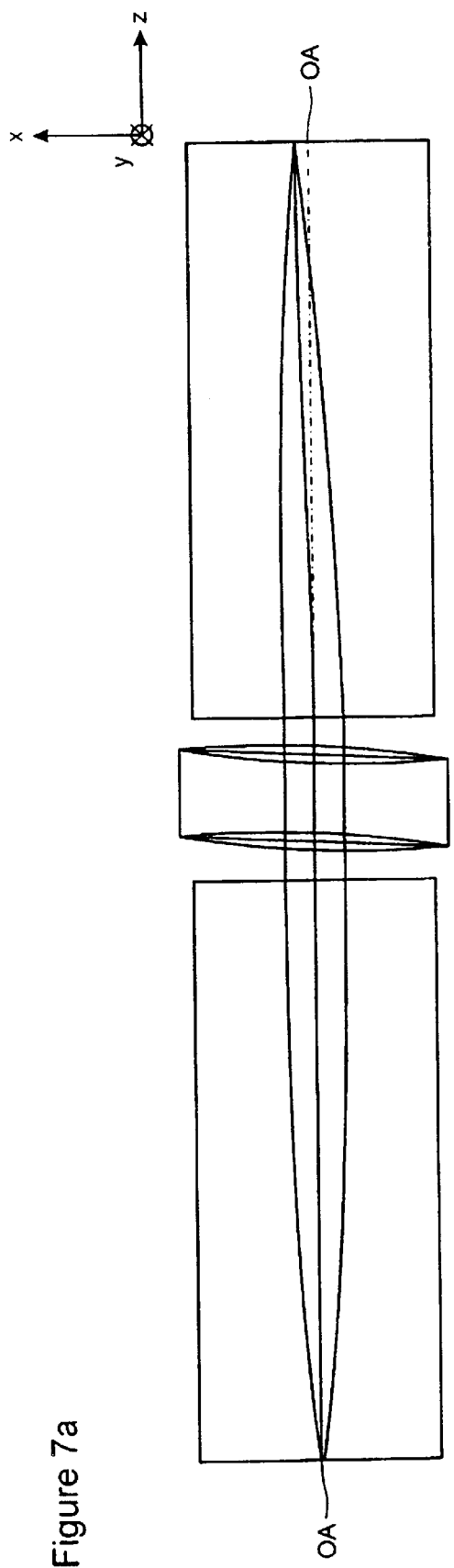
FIGS. 7(a) and 7(b) are diagrams of a pair of GRIN lenses having a light transmissive asymmetric wedge disposed therebetween, the wedge having wedge angles defined in both planes containing the optical axis. The tilt (FIG. 7(a)) or double-dimension wedge(FIG. 7(b)) thus induced provide improved angular sensitivity relative to a single wedge.
Figure 7B:
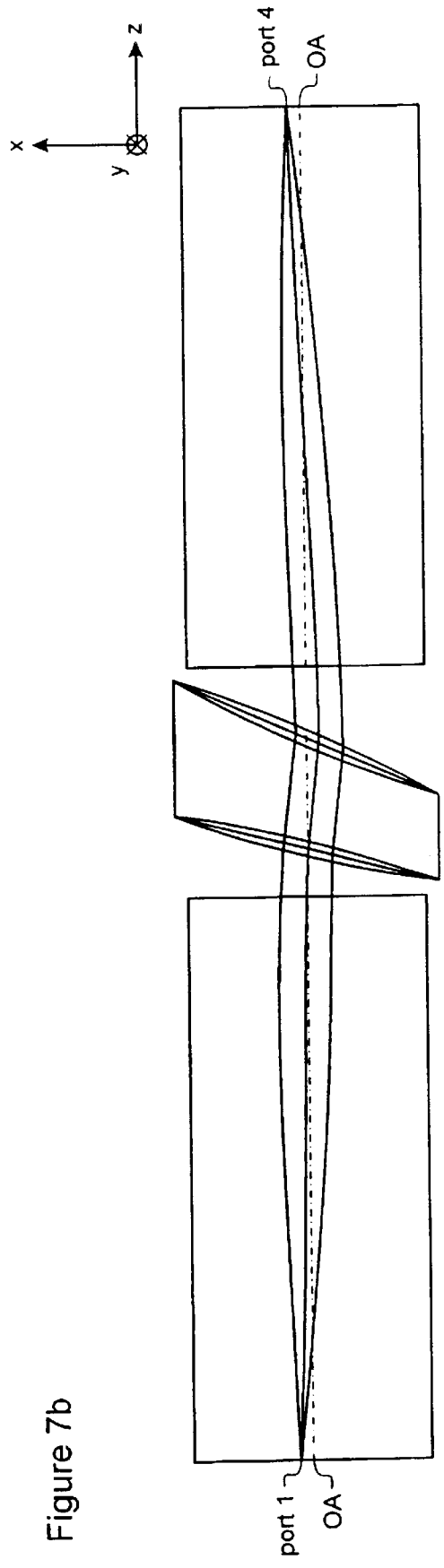

Referring now to FIG. 4, an optical coupling between two lenses 40a is shown, for the purposes of explanation of a preferred embodiment of the invention shown in FIGS. 5a and 5b. Here, in FIG. 5a a beam is launched into a first quarter pitch lens 40a so that its collimated or near-collimated output traverses the optical element in the form of a wedge 44, as defined above. In this embodiment the lenses 40a share the same optical axis and, in order to avoid unwanted etalon effects, have their inner end faces polished such that, viewed in the xz plane, they appear as lines subtending equal and opposite angles to the x-axis. In an alternative embodiment (FIG. 6) the lenses are disposed such that lines extending along their optical axes intersect and do not share a common optical axis. It can be seen that the effect on the collimated or near-collimated beam traversing the wedge 44 is that it is refracted by the first and second faces of the wedge; these refractions, in combination with the propagation through the wedge, have the net effect of angularly deviating the beam, on leaving the wedge, with respect to the incident angle of the beam. In this embodiment the light exiting the wedge is angularly deviated through a positive angle in the yz plane and consequently enters the lens 40a at an angle. Similar to FIG. 1a, as the light is incident on the lens front face at an angle to the optical axis of the lens, it is directed outward through a port parallel to and radially displaced from the optical axis of the lens. This is advantageous for coupling an optical fibre tube to the end face of the lens. The wedge 44 in FIG. 5b is oriented such that only two ports, port 1 and port 4 are optically coupled, light not coupling between the other two ports; rather light input from port 3 forms an output image radially displaced at least 100 microns away from the nearest active port, therefore there is no optical crosstalk. It can be seen that light from port 3 is directed to a location 57 offset from port 4 to which it couples light when the wedge is removed. The embodiments shown in FIGS. 7(*a*) and 7(*b*) demonstrate that the wedge may have angles defined in both planes containing the optical axis.

The operation of the optical switch shown in FIG. 5*a* and 5*b* is as follows. In a FIG. 5*a* the switch is shown in a first state with no wedge present between the ports, having ports 1 and 2 optically coupled, and having ports 3 and 4 simultaneously optically coupled.

In FIG. 5*b* with the wedge disposed between the ports, ports 1 and 4 are optically coupled and ports 3 and 2 are not coupled to each other or to the other ports. Of course known mechanical means can be provided to move the wedge 44 out of the path of the beams. For example in one embodiment, a solenoid driving a cam coupled to the wedge (not shown) is provided.

Of course, numerous other embodiments may be envisaged, without departing from the spirit and scope of the invention. For example an embodiment which is not preferred, but will function as a 1½×2 optical switch is one wherein the moveable element disposed in between the two GRIN lenses providing only one coupling between two ports, the other two ports being optically uncoupled, is a single sided reflector between the two lenses.

Notwithstanding, providing a 1½ optical switch that functions in transmission in both states is preferred.

What is claimed is:

1. An optical switch comprising:

four ports for receiving or transmitting one or more optical signals;

means for switching the switch between a first connect state and a second connect state, the switch in the first connect state having a single connection between two of the four ports while being absent a connection between the other two of the four ports, the switch in a second connect state for simultaneously providing a first connection between two ports of the four ports and a second connection between two other of the four ports, wherein the means for switching is an asymmetric optical element that when inserted between the ports in a path traversed by a beam launched into one of the ports, will provide for a single connection between two of the four ports while preventing light from propagating between two other of the four ports such that the switch is in the first state, the removal of the asymmetric optical element causing the switch to be in the second state providing a first connection between two ports of the four ports and a second connection between two other of the four ports simultaneously.

2. An optical switch comprising:

four ports for receiving or transmitting one or more optical signals;

means for switching the switch between a first connect state and a second connect state, the switch in the first connect state having a single connection between two of the four ports while being absent a connection between the other two of the four ports, the switch in a second connect state for simultaneously providing a first connection between two ports of the four ports and a second connection between two other of the four ports, wherein the means for switching is an optically transmissive wedge that when inserted between the ports in a path traversed by a beam launched into one of the ports, provides for a single connection between two of the four ports while preventing light from propagating between two other of the four ports such that the switch is in the first state, the removal of the wedge causing the switch to be in the second state simultaneously providing a first connection between two ports of the four ports and a second connection between two other of the four ports.

3. An optical switch comprising:

four ports for receiving or transmitting one or more optical signals;

means for switching the switch between a first connect state and a second connect state, the switch in the first connect state having a single connection between two of the four ports while being absent a connection between the other two of the four ports, the switch in a second connect state for simultaneously providing a first connection between two ports of the four ports and a second connection between two other of the four ports, the switch further comprising a first GRIN tens and a second Grin lens, the lenses each having adjacent an outer end face thereof two ports, the lenses being arranged such that their inner end faces are facing one another to allow light launched into two ports on one of the lenses to couple into different ports on the outer end face of the other lens, in the absence of an obstruction between the lenses, this coupling of light between two ports on one side with two ports on the other occurring when the switch is in the second state of operation, the means for switching comprising an optical element that when disposed between the lenses will cause the switch to be in the first state of operation wherein a single connection is provided between two of the four ports while preventing light from propagating between two other of the four ports.

4. An optical switch as defined in claim 3, wherein the optical element is a transmissive element allowing light launched into at least a region on an end face thereof therein to pass therethrough.

5. An optical switch as defined in claim 3, wherein the transmissive optical element is a wedge having two non-parallel end faces.

6. An optical switch as defined in claim 3, wherein the optical element has a reflective end face, for providing switching between only two ports through reflection.

* * * * *